United States Patent [19]

Gauger et al.

[11] Patent Number: 5,303,983
[45] Date of Patent: Apr. 19, 1994

[54] ROTATABLE SEAT BELT BUCKLE MOUNTING BRACKET FOR VEHICLE SEAT ADJUSTER

[75] Inventors: Derek K. Gauger, Ann Arbor; Stephen D. Crawford, Northville; Jeffrey D. Ineich, Waterford, all of Mich.

[73] Assignee: ITT Corporation, New York, N.Y.

[21] Appl. No.: 876,616

[22] Filed: Apr. 30, 1992

[51] Int. Cl.⁵ .............................................. B60R 22/26
[52] U.S. Cl. ................................ 297/472; 297/216.1; 297/473
[58] Field of Search ............................. 297/471–473, 297/216; 248/429, 430

[56] References Cited

U.S. PATENT DOCUMENTS

| | | | |
|---|---|---|---|
| 3,106,989 | 10/1963 | Fuchs | 297/472 X |
| 4,676,555 | 6/1987 | Tokugawa | 297/473 |
| 4,676,556 | 6/1987 | Yamanoi et al. | 297/473 |
| 4,757,969 | 7/1988 | Tolfsen | 297/471 X |
| 4,832,409 | 5/1989 | Borlinghaus et al. | 297/473 X |
| 5,102,197 | 4/1992 | Itsuki | 297/473 X |

FOREIGN PATENT DOCUMENTS

| | | |
|---|---|---|
| 0037726 | 10/1981 | European Pat. Off. |
| 0281071 | 9/1988 | European Pat. Off. |
| 0306122 | 3/1989 | European Pat. Off. |
| 3312480 | 10/1984 | Fed. Rep. of Germany |
| 3439076 | 4/1986 | Fed. Rep. of Germany |
| 3614457 | 11/1987 | Fed. Rep. of Germany |
| 3715861 | 12/1988 | Fed. Rep. of Germany |
| 2429125 | 1/1980 | France |

*Primary Examiner*—Peter R. Brown
*Attorney, Agent, or Firm*—Robert P. Seitter; J. Gordon Lewis

[57] ABSTRACT

A track assembly for a vehicle includes an upper track slidably mounted in a lower track. A seat belt buckle mounting bracket is attached to the upper track and connects a fixed seat belt to the upper track. The seat belt buckle mounting bracket includes first and second angularly disposed legs, with the first leg attached to the upper track and the second leg attached to a fixed seat belt buckle. The seat belt buckle mounting bracket is stationarily mounted in a first, normal operating position in which the second leg of the bracket extends upward from a side wall of the upper track, but rotates from the first position under a force applied through the fixed seat belt to a second position in which the second leg of the bracket is substantially aligned with the longitudinal axis of the upper track to place the first and second legs of the bracket in tension with the applied force. The second position provides a strong geometry position for the seat belt buckle mounting bracket.

12 Claims, 6 Drawing Sheets

ROTATABLE SEAT BELT BUCKLE MOUNTING BRACKET FOR VEHICLE SEAT ADJUSTER

BACKGROUND OF THE INVENTION

Field of the Invention:

The present invention relates, in general, to vehicle seats, and, more specifically, to seat belt attachments to vehicle seat adjusters.

Seat adjusters are used on the front seat(s) of automotive vehicles to provide selective horizontal fore and aft, vertical and/or recliner movements of the seat. Such seat adjusters carry an upper support frame which supports the seat bottom and sometimes the seat back of the vehicle seat. The upper support frame is mounted on first and second, spaced track assemblies, each formed of an upper track which is connected to the upper support frame and which is slidably mounted in a lower track anchored to the vehicle floor. In a power seat adjuster, a drive mechanism, typically formed of a bi-directional electric motor, is mounted between the track assemblies and rotates a pair of drive shafts extending outward from the motor to a gear assembly or box mounted on each upper track. In one arrangement, the gear box rotates a lead screw extending below each upper track. A drive block mounted to the lower track threadingly receives the lead screw to cause reciprocal movement of the upper track and the attached upper support frame upon selective energization of the drive motor. Other drive mechanisms may also be incorporated into the power seat adjuster to provide vertical movement of the seat frame as well as pivotal movement of the seat back with respect to the seat bottom.

Although such seat adjusters provide easy fore and aft movement of the seat in the lower tracks, it is imperative that the seat remain in a fixed, stationary position during a collision, such as a frontal collision, in order to prevent injury to the passenger using the seat. As a result, the weight and size of the seat adjuster components are selected to provide a maximum amount of strength to resist any movement under the high impact forces transmitted to the seat through the seat belt during a vehicle collision. Thus, the individual tracks, the torsion tubes or bars typically extending between and interconnecting the spaced upper tracks into a rigid structure and the other components of the seat adjuster are made with stronger materials and greater thicknesses and dimensions to provide the requisite amount of strength.

In current usage, a fixed seat belt buckle mounting bracket is mounted on the rear end of one of the movable upper tracks. The seat belt buckle mounting brackets typically have an L-shape and are fixedly attached to the upper track by welding or by fasteners. One leg of the bracket is attached directly to the upper track; while the second leg extends integrally from the first leg upward from the upper track.

This arrangement provides a stiffener for the upper track as well as providing a retention device for attaching a fixed seat belt carrying a bracket which receives the tongue of a corresponding seat belt portion extendably and retractably mounted on a reel.

However, due to the attachment of the seat belt buckle mounting bracket on the upper track, forward movement of the passenger during a frontal vehicle collision exerts a load on the seat belt which is transferred through the seat belt buckle mounting bracket to the upper track of the seat adjuster. This load creates a high stress at stress riser points formed at the compound bend in the seat belt buckle mounting bracket between the first and second legs of the bracket. Any tool marks, cracks, etc., at the bend, which typically is formed with a relief, are subject to fracture under such loads.

Thus, it would be desirable to provide an upper track for a vehicle seat adjuster which has an improved seat belt buckle attachment means which overcomes the problems of previously devised seat belt buckle attachment means. It would also be desirable to provide an upper track of a seat adjuster having a seat belt buckle mounting bracket which is designed to change its geometry and/or position under load from a weak geometry position to a stronger geometry position.

SUMMARY OF THE INVENTION

The present invention is a track assembly for a vehicle seat adjuster which has an improved seat belt buckle attachment means whose geometry changes under load to a strong, high strength geometry position to prevent fracture or breakage of the seat belt buckle attachment means.

In a preferred embodiment, the track assembly includes a lower track which is adapted to be stationarily anchored to the floor pan of a vehicle. An upper track is adapted to support a vehicle seat and is movably mounted on the lower track. Means are provided for adjusting the upper track relative to the lower track for fore and aft movement of the upper track in the lower track. Seat belt buckle attachment means are mounted on the upper track for attaching a fixed seat belt buckle to the upper track.

The seat belt buckle attachment means includes a member having first and second angularly disposed legs. The second leg is adapted to be attached to a fixed seat belt buckle. Means are provided for fixedly attaching the first leg to the upper track in a first, normal operating position and for allowing rotation of the member to a second position relative to the upper track under a predetermined force imposed on the member through the seat belt buckle attached thereto to place the first and second legs of the member in tension.

In a preferred embodiment, the seat belt buckle attachment means is an integral, one-piece member with the first and second legs being disposed at an obtuse angle with respect to each other. In the first, normal operating position, the second leg extends upward from the upper track and is disposed adjacent to a side wall of the upper track. In the second position, the second leg is disposed substantially co-axial with the longitudinal axis of the upper track to place the first and second legs of the member in tension which presents a stronger geometry position for the seat belt buckle mounting bracket and which has a higher strength to resist fracture, deformation, etc.

The seat belt buckle mounting bracket employed in a track assembly for a vehicle seat adjuster according to the present invention overcomes problems associated with previously devised seat belt buckle mounting brackets which are fixedly and stationarily attached to the movable upper track of a vehicle seat adjuster. By rotatably mounting the seat belt buckle mounting bracket to the upper track, the seat belt buckle mounting bracket can rotate under a load imposed on the seat belt buckle mounting bracket through the seat belt to a stronger geometry position which resists fracture or breakage and which insures that the seat belt buckle mounting bracket remains attached to the upper track of the track assembly during a frontal vehicle collision and despite any deformation or upward movement of the upper track with respect to the stationarily mounted lower track.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
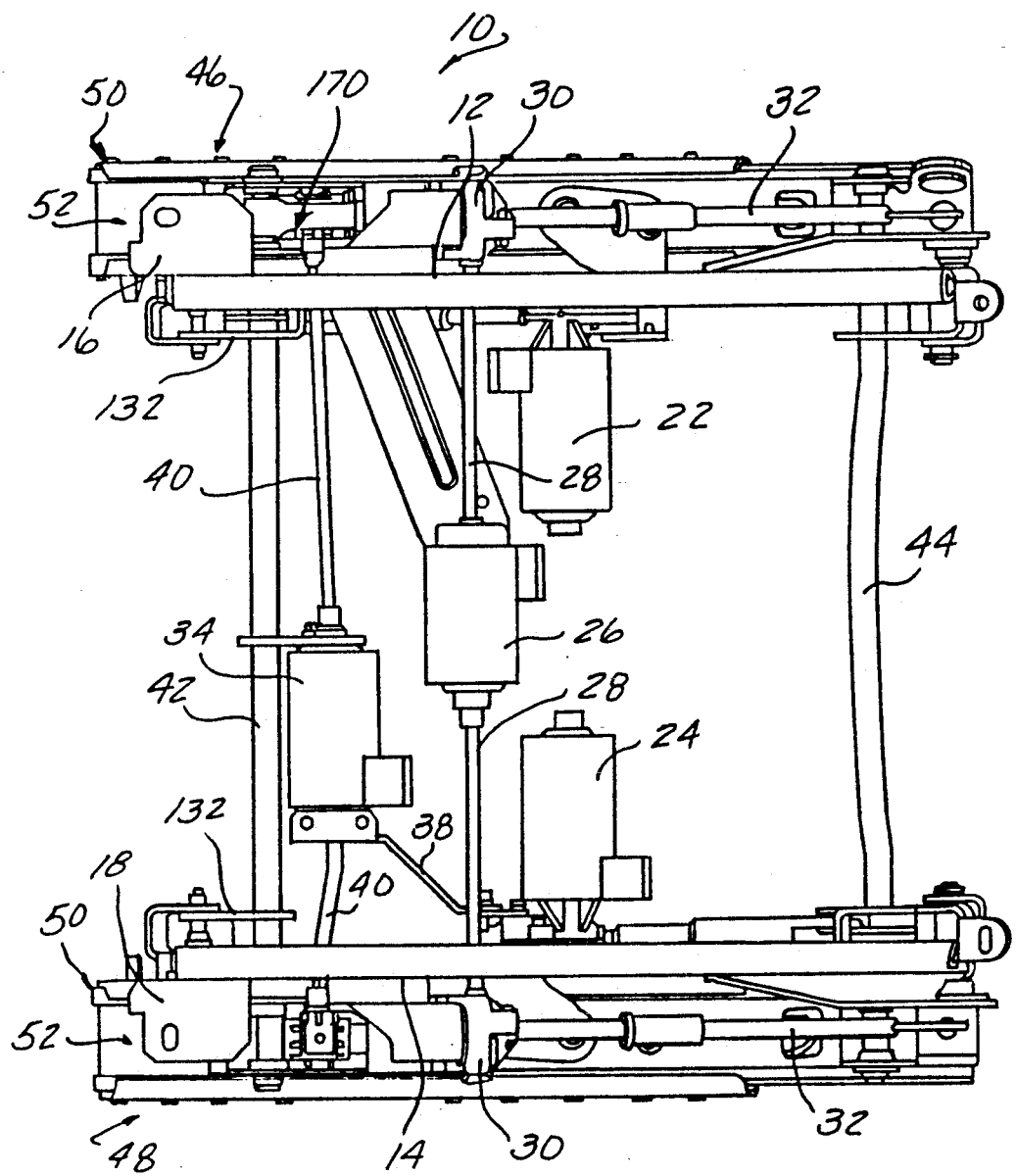
FIG. 1 is a plan view of a vehicle seat adjuster incorporating the seat belt buckle bracket of the present invention.
Figure 2:
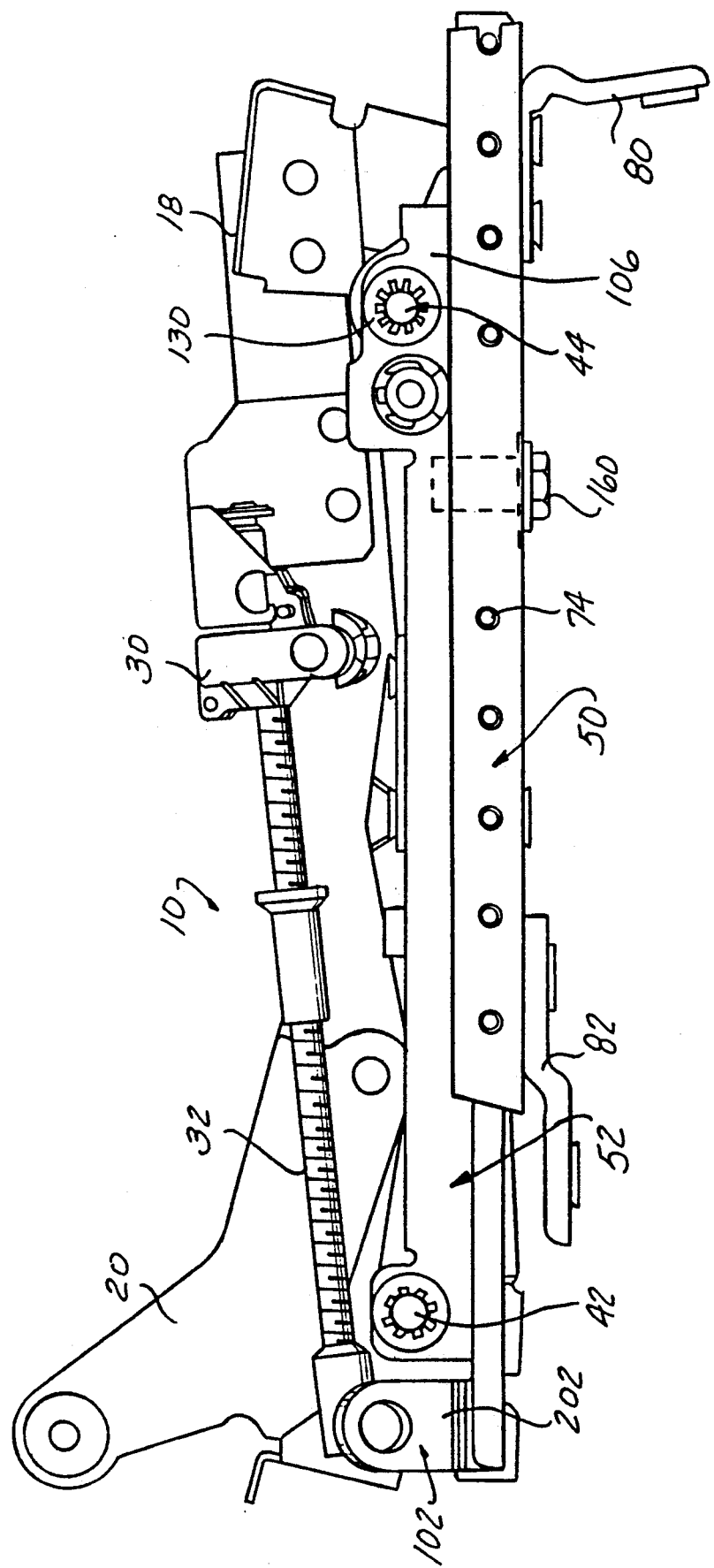
FIG. 2 is a side elevational view of the vehicle seat adjuster shown in 1.

Referring now to the drawing, and to FIGS. 1 and 2 in particular, there is illustrated a power seat adjuster 10 which variably positions an automotive vehicle seat in any user selected position. The power seat adjuster 10 is a so-called "eight-way" adjuster providing horizontal fore/aft, vertical up and down movement of separate front and rear portions of the adjuster as well as pivotal tilting of the seat back with respect to the seat bottom. It will be understood, however, that the present invention described hereafter is employable with a power seat adjuster which includes at least a horizontal fore-/aft movement and any number of other movements.

As is conventional, the power seat adjuster 10 supports a conventional vehicle seat, not shown, which includes a seat bottom and a seat back. An upper support frame is provided on the power seat adjuster 10 for supporting and connecting the seat bottom and seat back to the power seat adjuster 10. The upper support frame includes a pair of spaced, longitudinally extending frame members or rails 12 and 14. Mounting brackets 16 and 18, for example, are mounted on the ends of the frame members 12 and 14, respectively, and provide a mounting surface for connecting the seat bottom to the upper support frame. A pair of hinge plates 20 are also mounted on the upper support frame and provide a pivot connection between the seat back and seat bottom to permit selective tilting or pivotal movement of the seat back with respect to the seat bottom as is typical in so-called "seat recliners".

Various drive assemblies are mounted on the power seat adjuster 10 to provide selective movement of the power seat adjuster 10 along various axes. For example, front and rear vertical drive motors 22 and 24, respectively, are mounted on the power seat adjuster 10 and connected to conventional lead screws and drive blocks or nuts to move front and rear portions of the vehicle seat to provide selective vertical adjustment of the front and rear portions of the vehicle seat. In addition, a recliner drive motor 26 is interconnected by a pair of rotatable drive shafts to gear boxes 30 which are each coupled to a lead screw 32. The lead screws 32 are connected to one of the pivotal seat back hinge plates 20 mounted on opposite sides of the power seat adjuster 10 to provide selective pivotal adjustment of the seat back with respect to the seat bottom.

A horizontal drive means formed of a bi-directional electric motor 34 which is fixedly mounted to one of the upper tracks 50 by means of a suitable bracket 38. A pair of rotatable output shafts 40 extend outward from the horizontal drive motor 34 to a rotatable connection with a lead screw by a gear means mounted in opposed track assemblies as described hereafter. The output shafts 40 are, in an exemplary embodiment, flexible steel shafts covered by a polyurethane sleeve.

The power seat adjuster 10 also includes a pair of tubular torsion tubes or members 42 and 44 which extend between and are connected to the opposed track assemblies 46 and 48 and provide a rigid support structure for the power seat adjuster 10. As each of the track assemblies 46 and 48 is identically constructed, the following description will refer to only one track assembly 48. It will be understood that the opposite track assembly 46 is constructed in the same manner.

Figure 3:
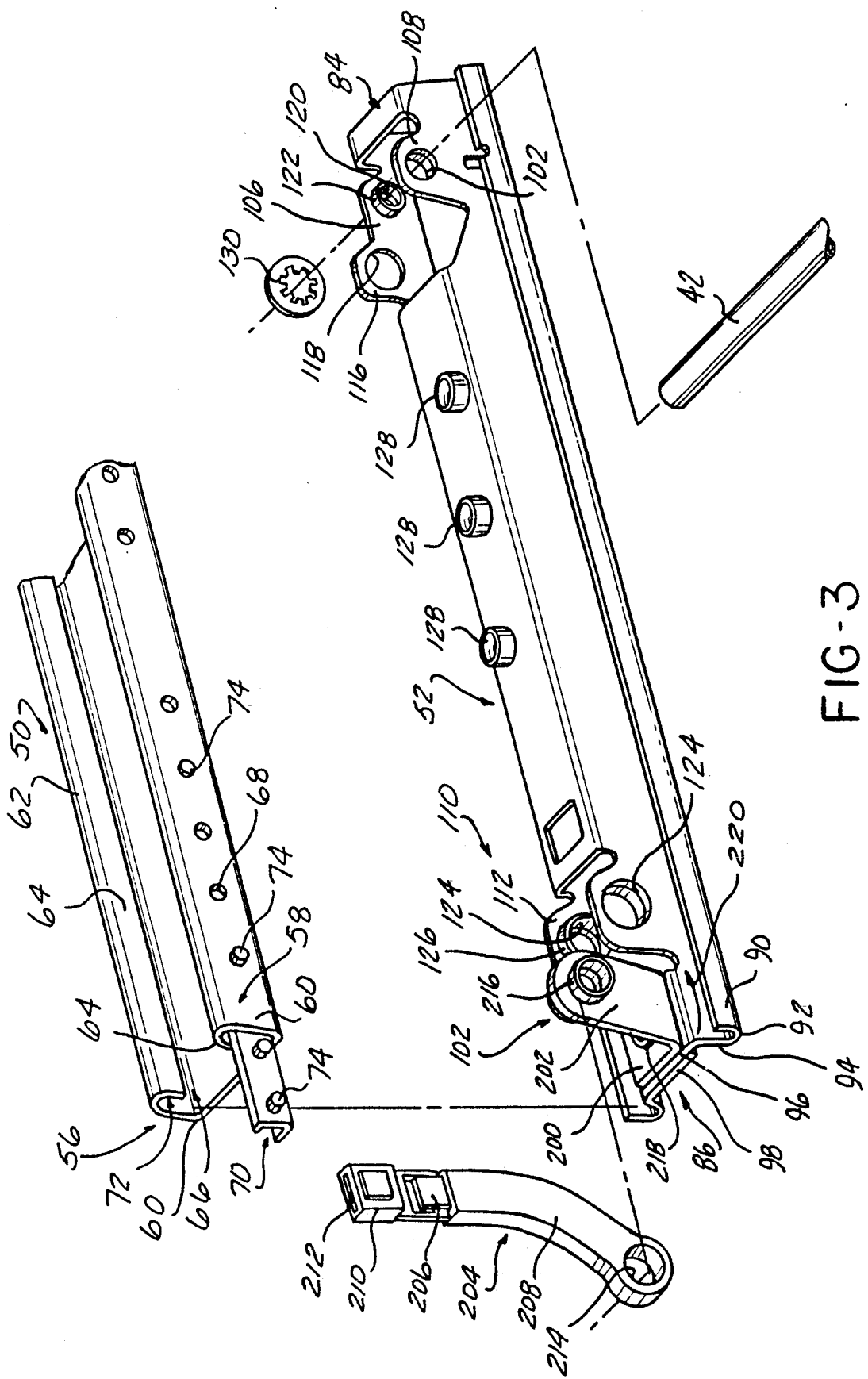
FIG. 3 is an exploded, perspective view showing the construction and mounting of the upper track of the present invention in a lower track.
Figure 4:
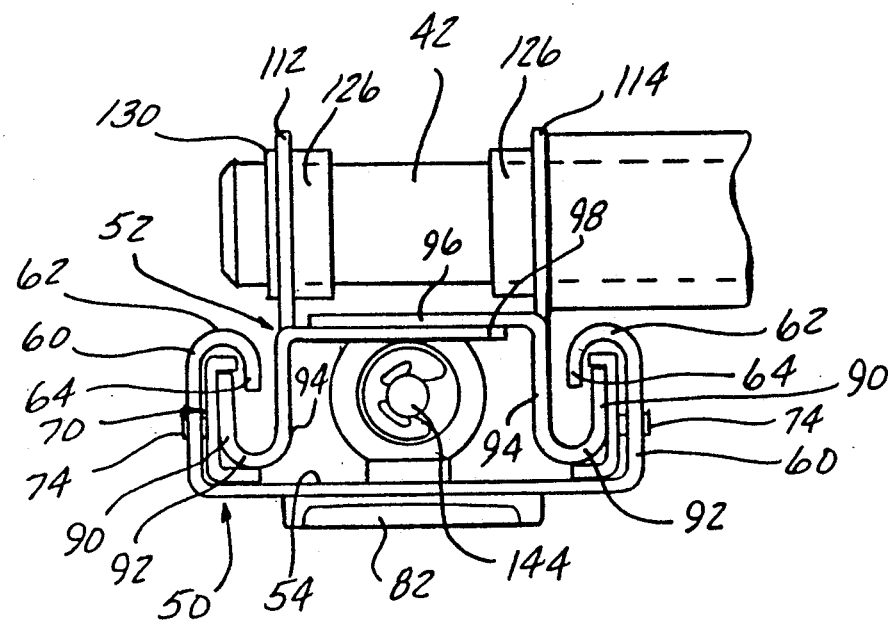
FIG. 4 is a left end view of the assembled upper and lower tracks shown in FIG. 3.

Referring now to FIGS. 1 and 2, and in detail to FIGS. 3 and 4, the track assembly 48 includes a lower track 50 and an upper track 52 which is slidably disposed within the lower track 50 and reciprocatingly movable bi-directionally along the lower track 50 under the control of the horizontal drive means. The lower track 50 is formed of an integral, one-piece member having a substantially planar central wall or web 54 and a pair of identically formed side walls 56 and 58 extending from opposite sides of the central wall 54. Each of the side walls 56 and 58 includes a vertically extending, outer side wall 60, a top wall 62 and an inward disposed lip or wall 64 which extends substantially vertically downward from the top wall 62 and is spaced from the outer side wall 60. The outer side wall 60, the top wall 62 and the inner wall 64 are formed in an inverted J-shape creating and surrounding a longitudinal extending channel 72. The lower edge of the inner wall 64 is spaced from the central wall 54 of the lower track 50 to define a longitudinally extending slot therebetween as denoted by reference number 66.

A plurality of spaced apertures 68 are formed in the outer side walls 60 of each side wall 56 and 58. A slide member 70, only one of which is shown in FIG. 3, is mounted in each channel 72 formed by the spaced portions of the central wall 54, the outer side wall 60, the top wall 62 and the inner wall 64 on opposite sides of the lower track 50. The slide 70 is substantially C-shaped and is complimentary to the shape of the channel 72. The sleeve 70 is formed of a suitable plastic material to provide a smooth sliding surface for the upper track 52, described hereafter, which is slidingly disposed within the slide 70. A plurality of outwardly extending pins 74 are formed on and extend outward from a side wall of the slide 70 and engage the apertures 68 in the outer side wall 60 of the corresponding side walls 56 and 58 of the lower track 50 to securely and stationarily position the slide 70 within the lower track 50.

As shown in FIG. 2, a front riser 80 and a rear riser 82 are attached to the lower track 50 at opposite ends thereof and provide a mounting connection to the vehicle floor by means of bolts or other suitable fasteners or anchors.

As shown in detail in FIG. 3, the upper track 52 is in the form of an elongated, one-piece, integrally formed member which is stamped, extruded, or otherwise formed from a suitable material, such as a high-strength, low alloy steel.

All of the various portions described hereafter which form a part of the upper track 52 are integrally formed with the entire upper track 52 and form an integral, continuous, unbroken, non-separate, part of the complete upper track 52. The upper track 52 includes a first a first end 84 and an opposed second end 86. A raised central portion or surface 88 extends between the first and second ends 84 and 86. The side walls of the upper track 52 are formed in the channel-like configuration complimentary to the shape of the channels 72 in the lower track 50 so as to enable the upper track 52 to be slidably disposed within the lower track 50 in sliding contact with the sleeves 70. Thus, each side wall of the upper track 88 is formed with a substantially J-shaped channel configuration formed of an outer side wall 90, a lower bottom wall 92 and an inner side wall 94 which extends to the central raised portion 88. The same channel-like configuration is also provided for the opposite longitudinal side wall of the upper track 52.

During the formation of the upper track 52, which is preferably by a stamping operation, a pair of overlapping flanges 96 and 98 are formed at the second end 86 of the upper track 52. Aligned apertures 100 are formed in each of the flanges 96 and 98 and provide a mounting point for the attachment of a seat belt buckle bracket 102 to the second end 86 of the upper track 52. The seat belt buckle bracket 102 provides an attachment point for a conventional seat belt buckle, not shown.

A first pair 104 of mounting flanges including spaced mounting flanges 106 and 108 are integrally formed in the upper track 52 adjacent the first end 84 thereof. A second pair 110 of mounting flanges including first and second mounting flanges 112 and 114 are integrally formed in the upper track 52 adjacent the overlapped flanges 96 and 98 at the second end 86 of the upper track 52. Each of the pairs 104 and 110 of mounting flanges is cut, such as by stamping, from the same material sheet used to form the entire one-piece upper track 52. After piercing, each pair of flanges 104 and 110 are then bent outwardly from the raised central portion 88 of the upper track 52 so as to be disposed in a substantially vertically extending position when the upper track 52 is mounted in its operating position in the power seat adjuster 10. Each of the mounting flanges 106, 108, 112 and 114 forming the first and second pair of mounting flanges 104 and 110 is substantially identically constructed with the exception of the mounting flange 106 which has an elongated end portion 116. An enlarged aperture 118 is formed in the end portion 116 to enable the drive shaft 40 of the horizontal drive motor 34 to pass therethrough to its connection to the horizontal gear means, as described hereafter.

A pair of co-axial aligned apertures 120 are formed in the mounting flanges 106 and 108 of the first pair of mounting flanges 104. The apertures 120 are preferably formed by an extrusion process which creates an inwardly extending, annular collar 122 extending toward the opposed mounting flange 106 or 108. The aligned apertures 120 provide a mounting connection for the tubular torsion tube 42 to the upper track 52 as described hereafter.

Similar coaxial apertures 124 are formed in the mounting flanges 112 and 114 of the second pair of mounting flanges 110 and are each formed with inwardly facing annular collars 126. The mounting apertures 124 provide a mounting connection for the other tubular torsion tube 44 as described hereafter.

Additionally, a plurality of longitudinally spaces apertures, each having an outwardly extending, annular collar 128 are formed on the raised central portion 88 of the upper track 50 and provide a mounting connection for a bracket used to attach the vertical drive motors 22 or 24 to each upper track 52.

As shown in FIG. 4, each torsion tube, such as torsion tube 42, extends through the aligned apertures in the mounting flanges 112 and 114 and the annular collars 126 associated therewith to connect the torsion tube 42 to the upper track 52. A fastener 130, such as a conventional push nut, is mounted on the outer end of the torsion tube 42 to securely attach the torsion tube 42 to the mounting flange 112. Referring briefly to FIG. 1, each torsion tube, such as torsion tube 42 is welded to a drive link 132 which is attached to the upper support 16 and spaced from the side wall of the upper track 52.

Figure 6:
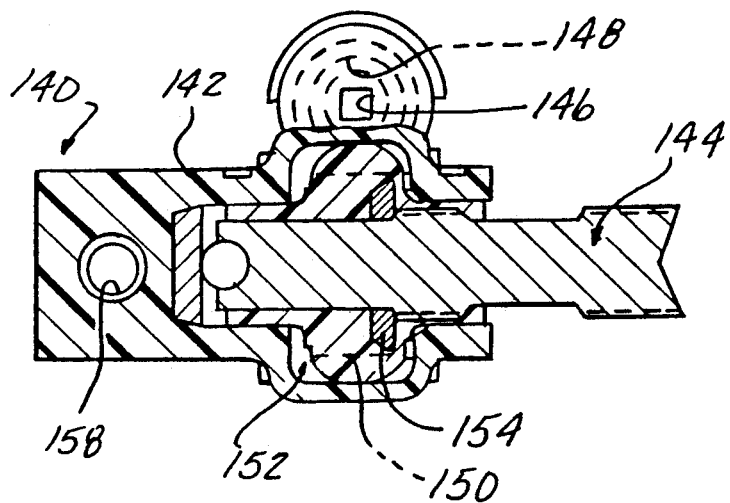
FIG. 6 is an enlarged, cross sectional view showing the gear means of the horizontal drive mechanism of the vehicle seat adjuster.
Figure 5:
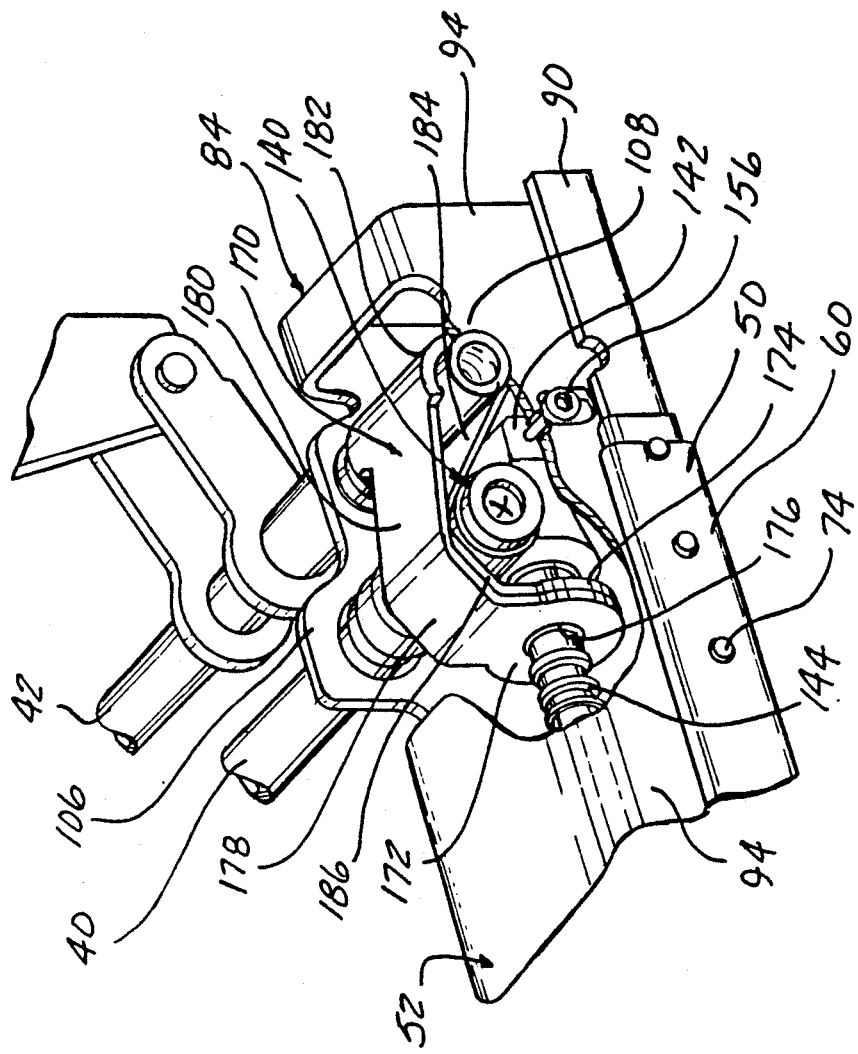
FIG. 5 is an enlarged, partial, perspective view showing a force transmitting catcher bracket mounted on the vehicle seat adjuster.

Referring now to FIGS. 5 and 6, there is depicted a detailed illustration of a portion of the horizontal drive means which moves the upper track 52 in either direction along the lower track 50. A gear means or box denoted generally by reference number 140 is mounted beneath the central raised portion 88 of the upper track 52 adjacent the first end 84 of the upper track 52. The gear box 140 includes a lightweight plastic housing 142 which surrounds internal gears which translate rotation of the horizontal drive motor drive shaft 40 to rotation of the perpendicularly oriented horizontal lead screw 144. By way of example only, a worm 148 and a worm gear 152 are mounted within the housing 142 of the gear box 140. A substantially square slot 146 is formed in the worm 148 and receives one end of the horizontal drive motor output shaft 40. The worm 148 meshingly engages a helix thread 150 formed on the worm gear 152 mounted on one end of the lead screw 144. The worm gear 152 is preferably insert molded about a knurled end portion of the lead screw 144 as shown in FIG. 6. A metallic washer 154 is welded to the end portion of the lead screw 144 within the worm gear 152 to provide additional strength to the gear box 140, for reasons which will become more apparent hereafter. The worm 148 and the worm gear 152 are preferably formed of a high strength plastic, such as DELRIN or NYLON.

A mounting pin 156 shown in FIG. 5 extends through a bore 158 in the housing 142 and engages opposed side walls 94 of the upper track 52 to mount the gear box 140 to the upper track 52.

As shown in FIG. 2, the lead screw 144 threadingly engages a drive block 160 which is stationarily mounted to the lower track 50 by means of a screw or other fastener 162. In this manner, rotation of the lead screw 144 in either direction will result in a linear movement of the upper track 52 with respect to the stationarily positioned lower track 50 through the coupling between the lead screw 144 and the drive block 160.

Referring again to FIG. 5, in another embodiment of the present invention, means are provided for bypassing the gear box 140 and transmitting forces imposed on the upper track 52 around the gear box 140 to the lower track 50. The force transmitting bypass means 170 preferably is in the form of a catcher strap or bracket which may have any suitable shape besides that illustrated in FIG. 5 and described hereafter. The shape of the catcher strap 170 may be varied to provide a predetermined force versus load compliance characteristic such that the catcher strap 170 exhibits controlled elongation under force loading. The catcher strap 170 is preferably in the form of a thin, planar strip formed to the desired shape. The strap 170 is also, preferably, formed of a mild steel.

By way of example only, the catcher strap 170, as shown in FIG. 5, is formed of an integral, one-piece member having first and second ends 172 and 174 bent or formed into an overlapping position substantially in registry with each other. Each of the first and second ends 172 and 174 is identically constructed and has an enlarged, substantially annular shape with a centrally located aperture 176 formed therein. A substantially planar, angularly disposed bent portion 178 extends continuously from the first end portion 172 to a horizontally oriented planar portion 180. The catcher strap 170 loops in an arcuate, loop-shaped portion 182 about the torsion tube 42 extending through the first end 84 of the upper track 52. The arcuate, loop-shaped portion 182 may or may not be in contact with the torsion tube 42. Extending from the arcuate, loop-shaped portion 182 is a second substantially linear portion 184 which merges into an angularly disposed, substantially planar portion 186 disposed adjacent to the angular portion 178. The angular portion 186 merges integrally into the enlarged second end portion 174.

In normal operation of the power seat adjuster 10, the catcher strap 170 merely rests in an inoperative position around the torsion tube 42 and over the gear box housing 142. The enlarged first and second end portions 172 and 174 surround the lead screw 144, with the lead screw 144 extending through the apertures 176 in the first and second ends 172 and 174 of the catcher strap 170 without impediment.

It will be noted that a similar catcher strap 170 could be mounted on the opposite track assembly of the power seat adjuster 10 if a second seat belt buckle mount is desired on the opposite track assembly.

In low load situations, such as those resulting from low or slow speed collisions of the vehicle having the power seat adjuster 10 mounted therein, the bypass means or catcher strap 170 on each track assembly remains in a substantially inoperative condition. During such low load situations, a force will be imparted by the seat belt buckle to the seat belt buckle attachment bracket 102 mounted at the second end 86 of the upper track 52 of one of the track assemblies. This load is then transferred through the seat belt buckle bracket 102 to the upper track 52 and then along the upper track 52 to the gear box housing 142 by the mounting pin 156 attached to the upper track 52. Although the gear box housing 142 is formed of a plastic material, under low load conditions, the gear box housing 142 will remain intact and thereby transmit the load through the worm gear 152 mounted therein to the lead screw 144. From the lead screw 144, the load is transferred through the drive block 160 to the lower track 50 which is securely anchored to the vehicle floor by means of the front and rear risers 80 and 82.

The force transmitting bypass 170 means comes into operation during high load conditions which occur during high speed vehicle collisions. During such high load conditions, the loading is initially the same as that described above in that a force or load will be imparted through the seat belt buckle attachment bracket 102 to the upper track 52. The load is then transferred from the upper track 52 through the mounting pin 156 to the gear box housing 142. However, the high force or load will exceed the strength of the gear box housing 142 thereby fracturing the gear box housing 142. At the same time, during such high load conditions, the upper track 52 is moved forward toward the front of the vehicle which imparts an elongation or tension load on the catcher strap 170. This brings the angular portions 178 and 186 of the catcher strap 170 into contact with the upper portion of the gear box housing 142 thereby causing an elongation of the catcher strap 170 and a controlled straightening of the angular portions 178 and 186 of the catcher strap 170.

Even though the gear box housing 142 is fractured and unable to transmit the load therethrough, the washer 154 which is welded to the end of the lead screw 144 and insert molded within the worm gear 152 remains intact and transfers the load imparted by the first ends 172 and 174 of the catcher strap 170 to the lead screw 144 where it is again transmitted through the drive block 160 to the lower track 50 which is securely anchored to the vehicle floor. In this manner, the forces imparted on the power seat adjuster 10 during low and high speed collisions are effectively transmitted through the various components of the power seat adjuster 10 to the vehicle floor to prevent any undesirable movement of the power seat adjuster 10 and the seat attached thereto during a collision. In the particular situation of a high speed collision which generates high impact forces on the power seat adjuster 10, the catcher strap 170 provides a force transmitting bypass path around the plastic gear box housing 142 which will fracture at a certain load and still enable the load to be transferred through the lead screw 144 and drive block 160 to the lower track 50 anchored to the vehicle floor.

Referring again to FIGS. 2 and 3, in current vehicle seat adjusters, such as the vehicle seat adjuster 10, the seat belt buckle mounting bracket 102 is mounted on one of the upper tracks 52 of the first and second track assemblies of the seat adjuster 10 and is movable therewith relative to the stationarily mounted lower track 50.

The seat belt buckle bracket mounting 102 is typically formed of a high strength metal and, preferably, has an integral, one-piece construction. The seat belt buckle mounting bracket 102, in an exemplary embodiment, includes a first leg 200 and an angularly disposed second leg 202. The second leg 202 is typically disposed at an obtuse angle with respect to the first leg to present a suitable mounting surface for a fixed seat belt shown generally by reference number 204 in FIG. 3. As is conventional, the fixed seat belt 204 includes a short fixed belt portion 206 which may be mounted in a protective plastic sleeve 208. A seat belt buckle 210 is connected to an outer end of the fixed seat belt 206 and includes a socket 212 for receiving the tongue, not shown, of an extendable/retractable belt portion of the seat belt system employed in a vehicle. One end of the fixed seat belt 206 and the fixed seat belt housing 208 is provided with a through bore 214 which rotatably engages and is retained on an outwardly extending collar 216 formed on the upper end of the second leg 202 of the seat belt buckle mounting bracket 102.

In FIG. 3, the seat belt buckle mounting bracket 102 is shown in a first, normal mounting position for normal use of the seat adjuster 10 during operation of the vehicle. In the first, normal position, the second leg 202 extends upward from the upper track 52 and is located adjacent to the side wall 94 of the upper track 52. The first leg 200 is attached to the upper track 52 by means of a suitable fastener 218 which provides the dual function of fixedly maintaining the seat belt buckle mounting bracket 102 in the first, normal position and, also, allowing the seat belt buckle mounting bracket 102 to rotate under a force or load applied to the seat belt buckle mounting bracket 102 during a frontal collision to a second, stronger geometry position as described hereafter.

Figure 7:
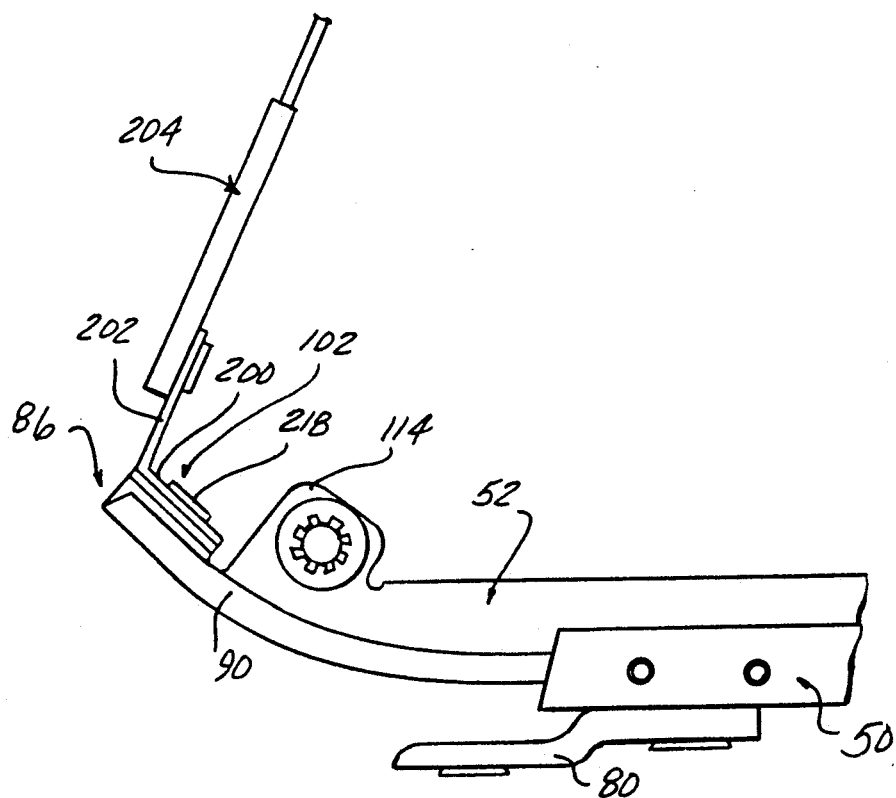
FIGS. 7 and 8 are pictorial views showing the positions of the upper track and the seat belt buckle mounting bracket under increasing load conditions.

During the initial application of a load to the seat belt buckle bracket 102, as shown in FIG. 3, the seat belt buckle bracket 102 will initially rotate in the direction of arrow 220 toward the first end 84 of the upper track 52. However, the continued application of load through the fixed seat belt 204 to the seat belt buckle mounting bracket 102 will result in an opposite, clockwise rotation of the seat belt buckle mounting bracket 102 with respect to the upper track 52 toward the second end 86 of the upper track 52. Simultaneously, as such force or load increases, the rear end 86 of the upper track 52 will curl upward, as shown in FIG. 7, away from its normal, substantially planar, horizontal position. This curling of the second end 86 of the upper track 52 occurs simultaneously with the clockwise rotation of the seat belt buckle mounting bracket 102 until the seat belt buckle mounting bracket 102 assumes the second position shown in FIG. 7 in which the second leg 202 is substantially aligned with the longitudinal axis of the upper track 52. This second position is a stronger geometry position for the seat belt buckle mounting bracket 102 since the first and second legs 200 and 202, respectively, are positioned to receive a tensile force applied through the fixed seat belt 204 to the seat belt buckle mounting bracket 102.

Figure 8:
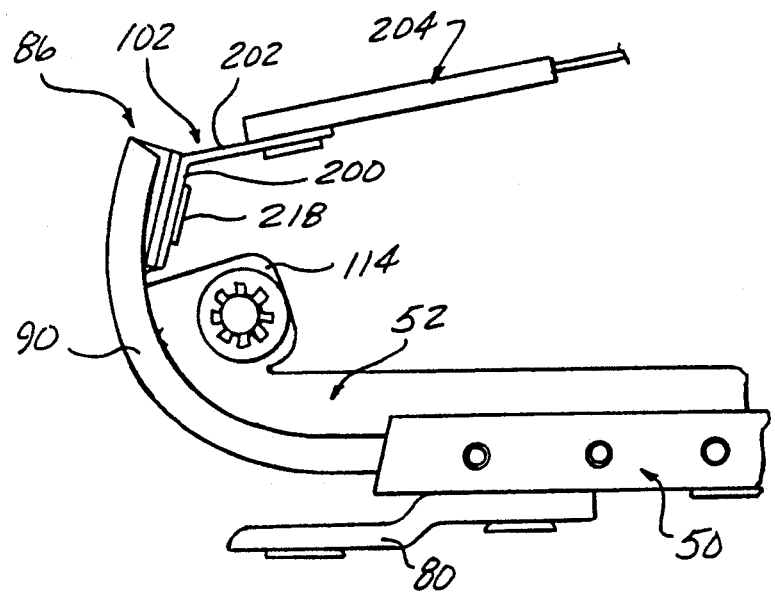

The continued application of increasing force to the seat adjuster 10 will cause a further curling or upward movement of the second end 86 of the upper track 52 with respect to the associated lower track 50 as shown in FIG. 8. This upward curling is accompanied with deformation of the upper track 52 and an increase in the angle between the first leg 200 and the second leg 202 of the seat belt buckle mounting bracket 102 due to the tensile force applied to the bracket 102. However, as this is a stronger geometry position, the seat belt buckle mounting bracket 102 remains integrally affixed to the upper track 52 to prevent separation or fracture of the bracket 102 from the upper track 52.

The attachment means 218 which provides such fixed attachment of the seat belt buckle mounting bracket 102 in a first, normal position and which also allows the seat belt buckle mounting bracket 102 to rotate to the second position shown in FIGS. 7 and 8, is formed, in a preferred embodiment, by a rivet which is mounted through aligned apertures formed in the first leg 200 of the seat belt buckle mounting bracket 102 and corresponding apertures formed in the overlapped flanges 96 and 98 at the second end 86 of the upper track 52. The rivet 218 allows such rotation of the seat belt buckle mounting bracket 102, as described above, yet retains the seat belt buckle mounting bracket firmly attached to the upper track 52.

In summary, there has been disclosed a unique track assembly for a vehicle seat adjuster which provides a stronger seat belt buckle mounting bracket attachment. The seat belt buckle mounting attachment means or bracket in the present invention is attached to the upper track and is held in a fixed, stationary position during normal operation of the seat adjuster 10. Yet, under a load imposed on the seat adjuster 10, such as during a frontal collision, the seat belt buckle mounting bracket rotates from the first position to a second position in which the upwardly extending second leg of the seat belt buckle mounting bracket is substantially aligned with the longitudinal axis of the upper track so as to place both of the first and second legs of the seat belt buckle mounting bracket in tension under the applied force. This is a stronger geometry position for the seat belt buckle mounting bracket and minimizes any potential fracture or breakage of the seat belt buckle mounting bracket as encountered with previously devised seat belt buckle mounting bracket attachment means and positions.

What is claimed is:

1. A track assembly for supporting a seat of a vehicle on the floor pan of the vehicle, the vehicle including a fixed seat belt buckle, the track assembly comprising:
   a lower track adapted to be stationarily anchored to a floor pan of a vehicle;
   an upper track adapted to support a vehicle seat, the upper track movably mounted on the lower track and having opposed first and second ends;
   means for adjusting the upper track relative to the lower track for fore and aft movement of the upper track with respect to the lower track; and
   seat belt buckle attachment means, mounted on the second end of upper track, for attaching a fixed seat belt buckle to the upper track, the seat belt buckle attachment means including:
   a member having first and second angularly disposed legs;
   the second leg adapted to be attached to a fixed seat belt buckle; and
   means for fixedly attaching the first leg to the second end of the upper track in a first, fixed, normal operating position and for allowing rotation of the member to a second position relative to the upper track under a predetermined force applied to the member through the fixed seat belt buckle causing an upward bending of the second end of the upper track to place the first and second legs of the member in tension.

2. The track assembly of claim 1 wherein the member is an integral, one-piece member.

3. The track assembly of claim 1 wherein the second leg of the member is normally disposed at an obtuse angle with respect to the first leg thereof.

4. The track assembly of claim 3 wherein in the first, normal operating position, the second leg extends upward from a side wall of the upper track.

5. The track assembly of claim 4 wherein in the second position, the second leg of the membmr is substantially aligned with a longitudinal axis of the upper track.

6. The track assembly of claim 1 wherein the seat belt attachment means further comprises:
   a rivet mounted through an aperture in the first leg of the member and a coaxial aperture formed in the upper track.

7. A seat adjuster for a vehicle having a floor pan and a fixed seat belt buckle, the seat adjuster comprising:
   first and second spaced track assemblies, each first and second track assembly comprising:
   a lower track adapted to be fixedly mounted on a vehicle floor pan; and an upper track slidably mounted in each lower track and having opposed first and second ends;

at least one tubular member extending between and mounted to the upper tracks of the first and second track assemblies;

means for adjusting the position of each upper track relative to the associated lower track for fore and aft movement of each upper track with respect to each lower track; and seat belt buckle attachment means, mounted on the second end of one of the upper tracks, for attaching a fixed seat belt buckle to the one upper track, the seat belt buckle attachment means including:

a member having first and second angularly disposed legs;

the second leg adapted to be attached to a fixed seat belt buckle; and means for fixedly attaching the first leg to the second end of the one upper track in a first, fixed, normal operating position and for allowing rotation of the member to a second position relative to the one upper track under a predetermined force applied to the member through the fixed seat belt buckle causing an upward bending of the second end of the one upper track to place the first and second legs of the member in tension.

8. The seat adjuster of claim 7 wherein the member is an integral, one-piece member.

9. The seat adjuster of claim 7 wherein the second leg of the member is disposed at an obtuse angle with respect to the first leg thereof.

10. The seat adjuster of claim 9 wherein in the first, normal operating position, the second leg extends upward from a side wall of the upper track.

11. The seat adjuster of claim 10 wherein in the second position, the second leg of the member is substantially aligned with a longitudinal axis of the upper track.

12. The seat adjuster of claim 7 wherein the seat belt attachment means further comprises:

a rivet mounted through an aperture in the first leg of the member and a coaxial aperture formed in the upper track.

* * * * *

UNITED STATES PATENT AND TRADEMARK OFFICE
CERTIFICATE OF CORRECTION

Page 1 of 2

PATENT NO. : 5,303,983
DATED : April 19, 1994
INVENTOR(S) : Derek K. Gauger

It is certified that error appears in the above-indentified patent and that said Letters Patent is hereby corrected as shown below:

Title page, item [57]
In the Abstract, line 11, please delete "," and insert --;--.

Column 6, line 53, after "158" please insert --(FIG. 6)--.

Column 10, line 31, after "of" please insert --the--.

Column 10, line 56, please delete "membmr" and insert --member--.

Drawings: Figure 3 should be deleted to appear as per attached Figure 3.

Signed and Sealed this

First Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

Page 2 of 2

PATENT NO. : 5,303,983
DATED : April 19, 1994
INVENTOR(S) : Derek K. Gauger

It is certified that error appears in the above-indentified patent and that said Letters Patent is hereby corrected as shown below:

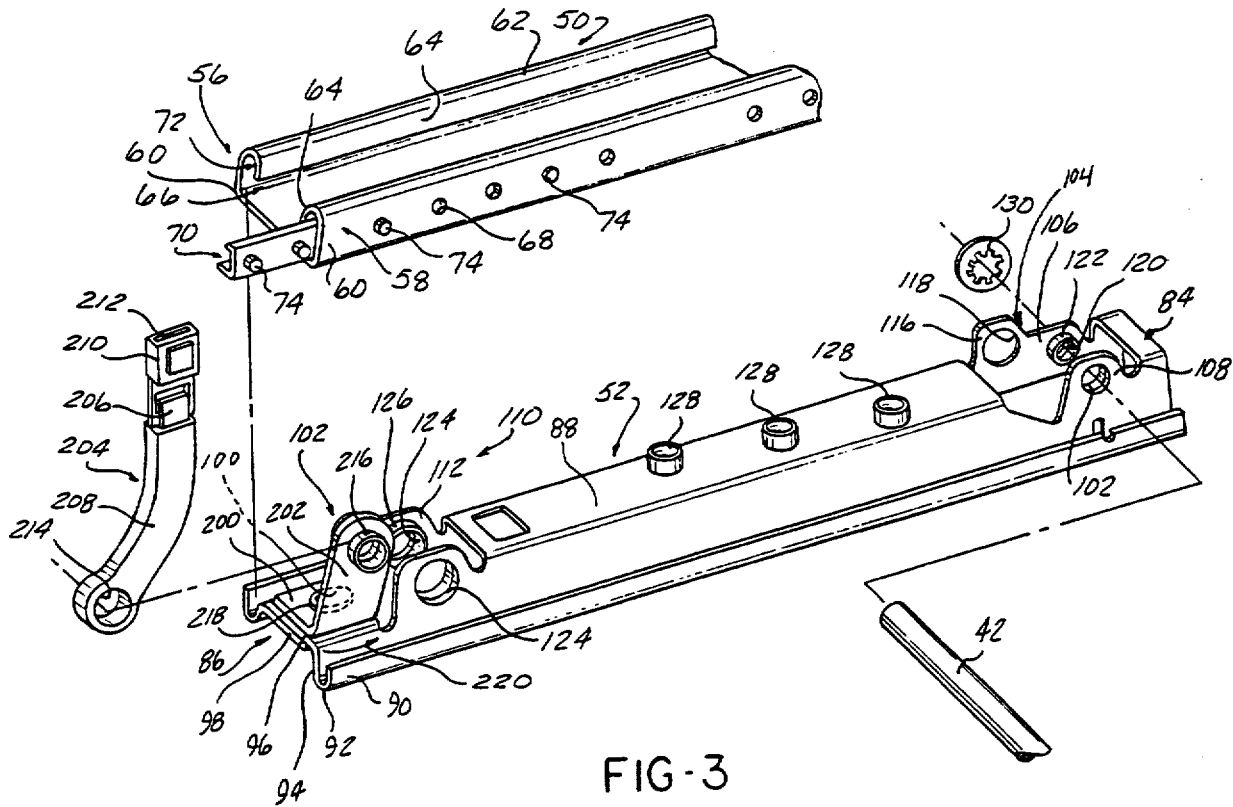

FIG-3